(12) United States Patent
Staerzl

(10) Patent No.: US 6,973,890 B1
(45) Date of Patent: Dec. 13, 2005

(54) SELF-ADAPTIVE SYSTEM FOR AN APPARATUS WHICH INHIBITS FOULING OF AN UNDERWATER SURFACE

(75) Inventor: Richard E. Staerzl, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/945,311

(22) Filed: Sep. 20, 2004

(51) Int. Cl.⁷ .............................................. B63B 59/00
(52) U.S. Cl. ..................................... 114/67 R; 114/222
(58) Field of Search ............................ 114/67 R, 67 A, 114/222

(56) References Cited

U.S. PATENT DOCUMENTS

| | | | |
|---|---|---|---|
| 948,355 A | 2/1910 | Tatro et al. | |
| 1,021,734 A | 3/1912 | Delius et al. | |
| 3,625,852 A | 12/1971 | Anderson | 204/196 |
| 5,052,962 A * | 10/1991 | Clark | 440/83 |
| 5,346,598 A * | 9/1994 | Riffe et al. | 422/6 |
| 6,173,669 B1 | 1/2001 | Staerzl | 114/222 |
| 6,209,472 B1 | 4/2001 | Staerzl | 114/222 |
| 6,514,401 B2 | 2/2003 | Chyou et al. | 205/739 |
| 6,547,952 B1 | 4/2003 | Staerzl | 205/724 |
| 6,811,681 B2 * | 11/2004 | Dowling et al. | 205/725 |
| 6,822,462 B1 * | 11/2004 | Staerzl | 324/712 |

\* cited by examiner

*Primary Examiner*—Stephen Avila
(74) *Attorney, Agent, or Firm*—William D. Lanyi

(57) ABSTRACT

A system is provided which automatically calibrates a marine fouling prevention system. It responds to movements between fresh and saltwater bodies of water, detects damage to the hull or other submerged surface, and responds to the use of the fouling prevention system with different sizes of marine vessels.

21 Claims, 3 Drawing Sheets

SELF-ADAPTIVE SYSTEM FOR AN APPARATUS WHICH INHIBITS FOULING OF AN UNDERWATER SURFACE

BACKGROUND OF THE INVENTION

1. Field of the Invention

The present invention is generally related to a system for inhibiting fouling of an underwater surface and, more particularly, to a system which is capable of self-calibration in order to select appropriate voltages and currents for its operation, to determine the type of water in which the surfaces are submerged, and to diagnose faults or damage in the underwater surfaces.

2. Description of the Prior Art

Many different systems are well known to those skilled in the art of inhibiting the fouling of underwater surfaces. Depending on the type of water in which the surfaces are submerged or partially submerged, the fouling can consist of algae, barnacles, zebra muscles, or other types of underwater organisms that tend to grow on and cling to submerged surfaces. The submerged surfaces can be portions of a hull of a marine vessel or other submerged components, such as grates for underwater conduits.

U.S. Pat. No. 948,355, which issued to Tatro et al. on Feb. 8, 1910, describes a system that provides anodes and cathodes on a ship and passes electric current through these two poles. The circuit is completed through seawater near the ship and chlorine is liberated. The chlorine kills the barnacles near the ship and prevents barnacles from fouling the submerged surface of the ship.

U.S. Pat. No. 1,021,734, which issued to Delius et al. on Mar. 26, 1912, is intended for use with a ship that has a metallic surface. An electric generator or other source of current is used and a switch is used to periodically change the circuit of an anode and a cathode which is completed through water surrounding the ship. Chlorine is produced and the fouling of the submerged surface of the ship is inhibited.

U.S. Pat. No. 3,625,852, which issued to Anderson on Dec. 7, 1971, describes a marine antifouling system. The antifouling system is intended for use with a boat or ship having a keel and sides diverging upwardly therefrom. A pair of laterally spaced elongated anode electrode components are mounted externally on one side of the hull substantially adjacent the keel and lengthwise thereof. An elongated cathode electrode component is mounted externally on the lengthwise of the keel in spaced relationship between the anode electrode components. A source of electric current energizes the anode electrode components with a positive potential and the cathode electrode component with a negative potential to produce various chemicals, such as chlorine, which inhibits fouling of the surface of the ship.

U.S. Pat. No. 6,173,669, which issued to Staerzl on Jan. 16, 2001, discloses an apparatus and method for inhibiting fouling of an underwater surface. Current is caused to flow through seawater in which two conductive surfaces are submerged or partially submerged. A monitor measures the current flowing from one of the two surfaces to the other in order to assure that no leakage of current of substantial quantity exists. By alternating current direction between the two surfaces, both surfaces can be provided with sufficient chlorine gas bubbles to prevent marine growth from attaching to the surfaces.

U.S. Pat. No. 6,209,472, which issued to Staerzl on Apr. 3, 2001, discloses an apparatus and method for inhibiting fouling of an underwater surface. The system provides an electric current generator which causes an electric current to flow proximate the underwater surface. A source of electric power causes a flow of current which passes from the underwater surface through water surrounding the surface or in contact with the surface. Gas is liberated from seawater and inhibits the growth of barnacles and other microorganisms on the submerged surfaces.

U.S. Pat. No. 6,547,952, which issued to Staerzl on Apr. 15, 2003, discloses a system for inhibiting fouling of an underwater surface. Ambient temperature cure glass (ATC glass) provides a covalent bond on an electrically conductive surface, such as nickel-bearing paint. In this way, boat hulls, submerged portions of outboard motors, and submerged portions of sterndrive systems can be protected effectively from the growth of marine organisms, such as barnacles. The protective coating of glass inhibits the migration of metal ions from the electrically conductive surface into the seawater and therefore inhibits corrosive degradation as a result of galvanic action.

The patents described above are hereby expressly incorporated by reference in the description of the present invention.

As marine surfaces, such as the surfaces of a boat hull, experience different conditions (e.g. a move from saltwater to freshwater or vice versa), it would be significantly beneficial if an automatic system could be provided to make appropriate adjustments in the operation of the antifouling system. In addition, it would be significantly beneficial if an automatic calibration system could be provided for this type of antifouling system. Furthermore, a system that could detect damage to an antifouling surface would provide a significant benefit to a system for preventing marine fouling of that surface.

SUMMARY OF THE INVENTION

A method for controlling a marine fouling prevention system, in accordance with a preferred embodiment of the present invention, comprises the steps of providing the first and second submerged surfaces and a source of electrical power. It also provides the step of connecting the first and second surfaces to the source of electrical power and causing a magnitude of current to flow between the first and second surfaces for a preselected period of time. It also includes the step of measuring a voltage potential between the first and second surfaces and determining an operating parameter of the marine fouling prevention system as a function of the voltage.

The method of the present invention can further comprise the step of calculating an operating current for the marine fouling prevention system as a function of the voltage potential, the magnitude of current, and a preselected target operating voltage. The operating current is the operating parameter of the marine fouling prevention system in this type of embodiment. The present invention can further comprise the step of controlling a subsequent operation of the marine fouling prevention system by regulating a current between the first and second surfaces to be generally equal to the operating current which is determined as a function of the measured voltage potential and a desired operating voltage potential. The first surface can be a starboard side of the hull of a marine vessel and the second surface can be the port side of a hull of the marine vessel. The operating parameter can be representative of the type of water in which the marine fouling prevention system is operating. The voltage potential can be indicative of a fault condition related to the marine fouling prevention system.

A preferred embodiment of the present invention can further comprise comparing the voltage potential to a threshold voltage potential and then determining that the marine fouling prevention system is damaged if the voltage potential is less than the threshold voltage potential. In certain embodiments of the present invention, it can further comprise the steps of comparing the operating current to a first threshold operating current and replacing the operating current with a first default operating current value when the operating current is less than the first threshold operating current. The present invention can further comprise the step of comparing the operating current to a second threshold operating current and replacing the operating current with a second default operating current when the operating current is greater than the second threshold operating current.

The magnitude of current used in a preferred embodiment of the present invention can be between 0.5 amperes and 1.5 amperes and, in a particularly preferred embodiment, is generally equal to 1.0 amperes. The preselected period of time in a preferred embodiment of the present invention can be between five minutes and fifteen minutes and, in a particularly preferred embodiment, is generally equal to ten minutes. Alternatively, the preselected period of time can be actively determined by monitoring the rate of change of the voltage potential while the magnitude of current is flowing between the first and second surfaces during the calibration procedure. In other words, as the rate of change of voltage decreases, the system is becoming polarized and polarization of the system can allow the voltage potential to be measured and used to calculate the operating parameter, such as the operating current, without the need for waiting for a specific period of time to elapse.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
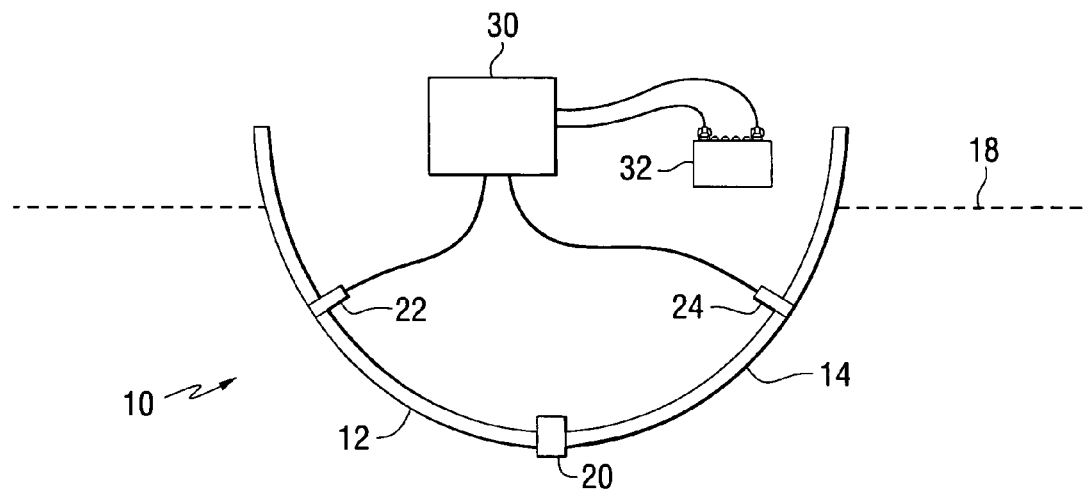
FIGS. 1 and 2 are schematic representations of two systems that can be used to prevent fouling of a submerged surface.

Throughout the description of the preferred embodiment of the present invention, like components will be identified by like reference numerals.

FIG. 1 is a schematic representation of a marine vessel 10 with a first surface 12 and a second surface 14 which are partially submerged below the surface 18 of a body of water. The first and second surfaces, 12 and 14, can be the port and starboard surfaces of the hull of the marine vessel. These first and second surfaces are electrically conductive, either by manufacturing the hull from electrically conductive materials or providing an electrically conductive coating on the surface of the hull. The first and second surfaces are insulated from each other by a nonconductive keel member 20. Two electrodes, 22 and 24, are symbolically illustrated as providing an electrical connection between the first and second surfaces, 12 and 14, and a controller 30 which is used to control the voltages of the first and second surfaces. The controller 30 is connected to a power source, such as a battery 32, in order to distribute electric current to the first and second surfaces in a manner which is generally similar to the techniques described in the patents cited above. This type of system is generally similar to the devices described in U.S. Pat. Nos. 6,173,669 and 6,209,472.

Figure 2:
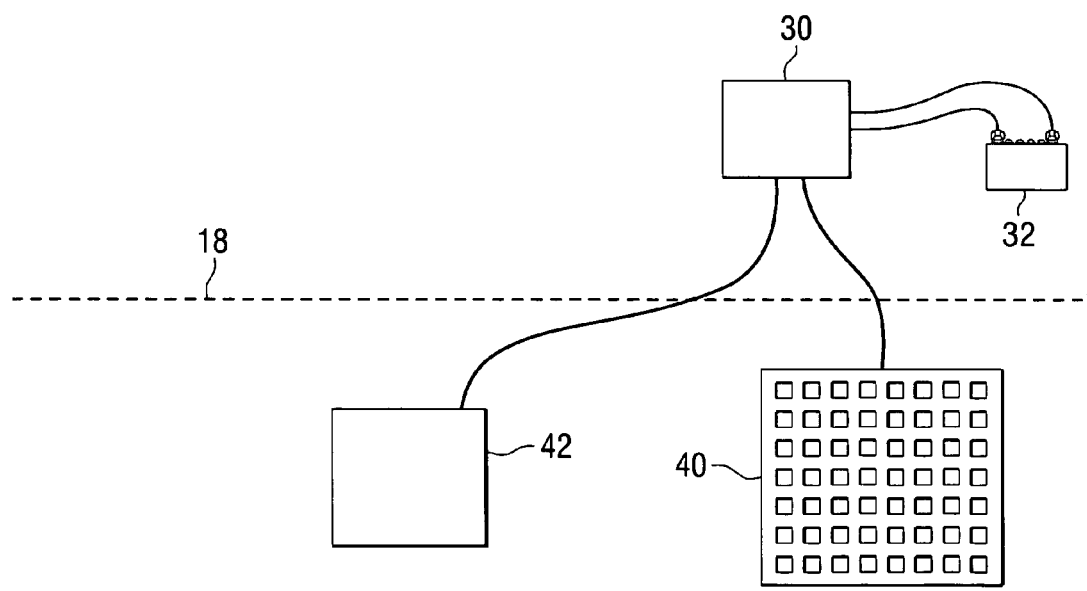

FIG. 2 illustrates a marine fouling prevention system that is not associated with the hull of a marine vessel 10 such as that described in conjunction with FIG. 1. Instead, the controller 30 and battery 32 are associated with a grate 40 and an associated conductive surface 42. As described in the patents cited above, the submerged surfaces of the grate 40 and the other conductive surface 42 can be used to produce chlorine gas bubbles on the surface of a device which is intended to be protected by the fouling prevention system, such as the grate 40.

Figure 3:
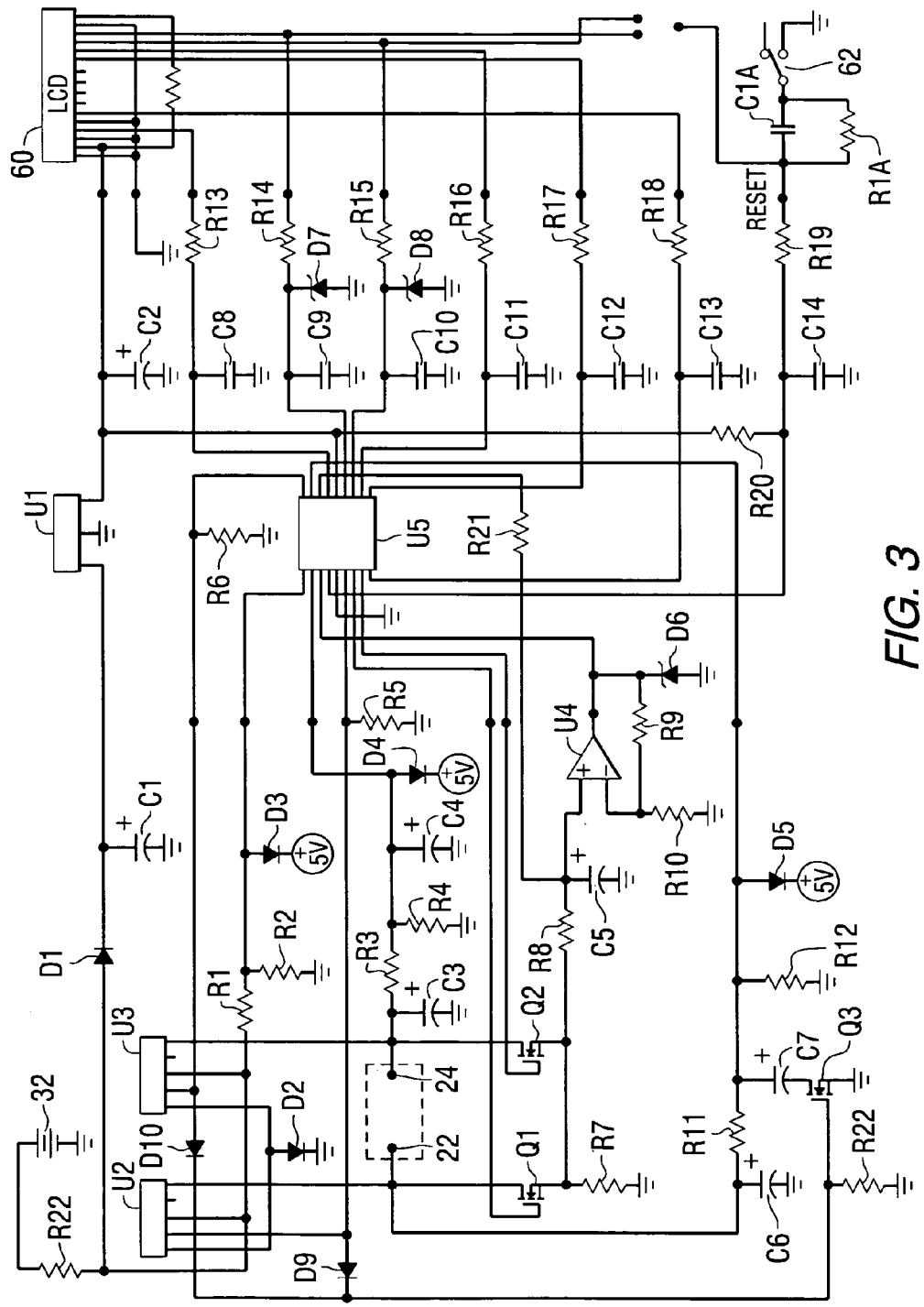
FIG. 3 is a circuit that can be used in conjunction with one embodiment of the present invention.

FIG. 3 is a schematic representation of a circuit that can be used to perform the processes of a preferred embodiment of the present invention. Various components are identified in FIG. 3 and described in Table I below.

| REFERENCE | TYPE |
| --- | --- |
| R1 | 1000 kΩ |
| R1A | 100 kΩ |
| R2 | 45.3 kΩ |
| R3 | 100 kΩ |
| R4 | 45.3 kΩ |
| R5 | 1 kΩ |
| R6 | 1 kΩ |
| R7 (Sense) | 0.1 Ω |
| R8 | 20 kΩ |
| R9 | 10 kΩ |
| R10 | 1.1 kΩ |
| R11 | 100 kΩ |
| R12 | 45.3 kΩ |
| R13 | 100 kΩ |
| R14 | 100 kΩ |
| R15 | 100 kΩ |
| R16 | 100 kΩ |
| R17 | 100 kΩ |
| R18 | 100 kΩ |
| R19 | 100 kΩ |
| R20 | 10 kΩ |
| R21 | 10 kΩ |
| R22 | 10 kΩ |
| R22-PTC | 0.011 Ω |
| C1 | 10 μF |
| C2 | 10 μF |
| C3 | 10 μF |
| C4 | 10 μF |
| C5 | 10 μF |
| C6 | 10 μF |
| C7 | 10 μF |
| C8 | 0.001 μF |
| C9 | 0.001 μF |
| C10 | 0.001 μF |
| C11 | 0.001 μF |
| C12 | 0.001 μF |
| C13 | 0.001 μF |
| C14 | 0.001 μF |
| C1A | 0.1 μF |

Electrical circuits which are suitable for providing a current flow between submerged surfaces are described in the patents cited above. More specifically, U.S. Pat. No. 6,173,669 illustrates such a circuit in its FIG. 10. U.S. Pat. No. 6,209,472 describes another circuit suitable for these purposes in conjunction with its FIG. 9.

FIG. 3 shows a circuit that is particularly suited for use in conjunction with a preferred embodiment of the present invention. Components U2 and U3 are used in conjunction with components Q1 and Q2 to form an H-bridge circuit which can alternate the directions of current flow between two submerged surfaces, such as the port and starboard sides of a marine vessel as identified by reference numerals 12 and 14 in FIG. 1. The points in the circuit of FIG. 3 identified by reference numerals 22 and 24 represent the electrodes that can be connected to those two submerged surfaces. The circuit shown in FIG. 3 is particularly suited for use in an application of the present invention in conjunction with port and starboard sides of a marine vessel hull. The components identified as R3, C3, R4, C4, and D4 provide a filter for the starboard side of the vessel when the microprocessor U5 reads the resulting voltage during a calibration procedure. The components identified as C6, R11, C7, R12, and D5 perform a similar filtering function in conjunction with the port side electrode 22. An amplifier associated with the microprocessor U5 and used during the measurement of a voltage potential between the first and second surfaces, comprises the component identified as U4 in FIG. 3 and the components identified as R8, C5, R10, R9, and D6. The battery 32 is represented in FIG. 3 and is associated with a resetable fuse which is identified as R22. The microprocessor U5 controls the current flowing through the water between the first and second surfaces (i.e. between electrodes 22 and 24) and also controls messages which are provided on a liquid crystal display 60. Noise filters are provided for the connections between the liquid crystal display 60 and the microprocessor U5. As shown in FIG. 3, these filters comprise capacitors C8–C14 and resistors R13–R19. A five volt voltage supply component U1 is connected to the LCD 60.

With continued reference to FIG. 3, a switch 62 is provided to allow an operator to request certain actions to be performed. A single closure of the switch 62 is recognized by the microprocessor U5 as a request to reset the system. Three consecutives closures of the switch 62 signifies that the operator wishes to perform a calibration procedure. The components identified as R20, R1A, and C1A assure that a single pulse is received for each closure of the switch 62.

In FIG. 3, resistor R7 is a sense resistor that allows the microprocessor to determine the magnitude of current flowing between the first and second surfaces, 12 and 14, and regulate to a desired magnitude of current. After the first and second surfaces initially become polarized and the current flow is stabilized, a voltage potential can be measured to determine the voltage associated with that preselected magnitude of current, such as 1.0 amperes. The method of the present invention will be described in greater detail below.

In FIG. 3, the Schottky diodes, D4 and D5, the Zenor diodes, D7 and D8, and the other known components illustrated in FIG. 3 perform functions that are well known to those skilled in the art and will not be described in detail herein. Similarly, the high-side drivers, U2 and U3, and the low-side drivers, Q1 and Q2, are well known to those skilled in the art and will not be described in detail herein. The microprocessor U5 can be one which is available in commercial quantities and identified as PIC16F88 or an equivalent device. Similarly, the liquid crystal display (LCD) 60 can typically be a sixteen-by-two display device or any equivalent component.

Figure 4:
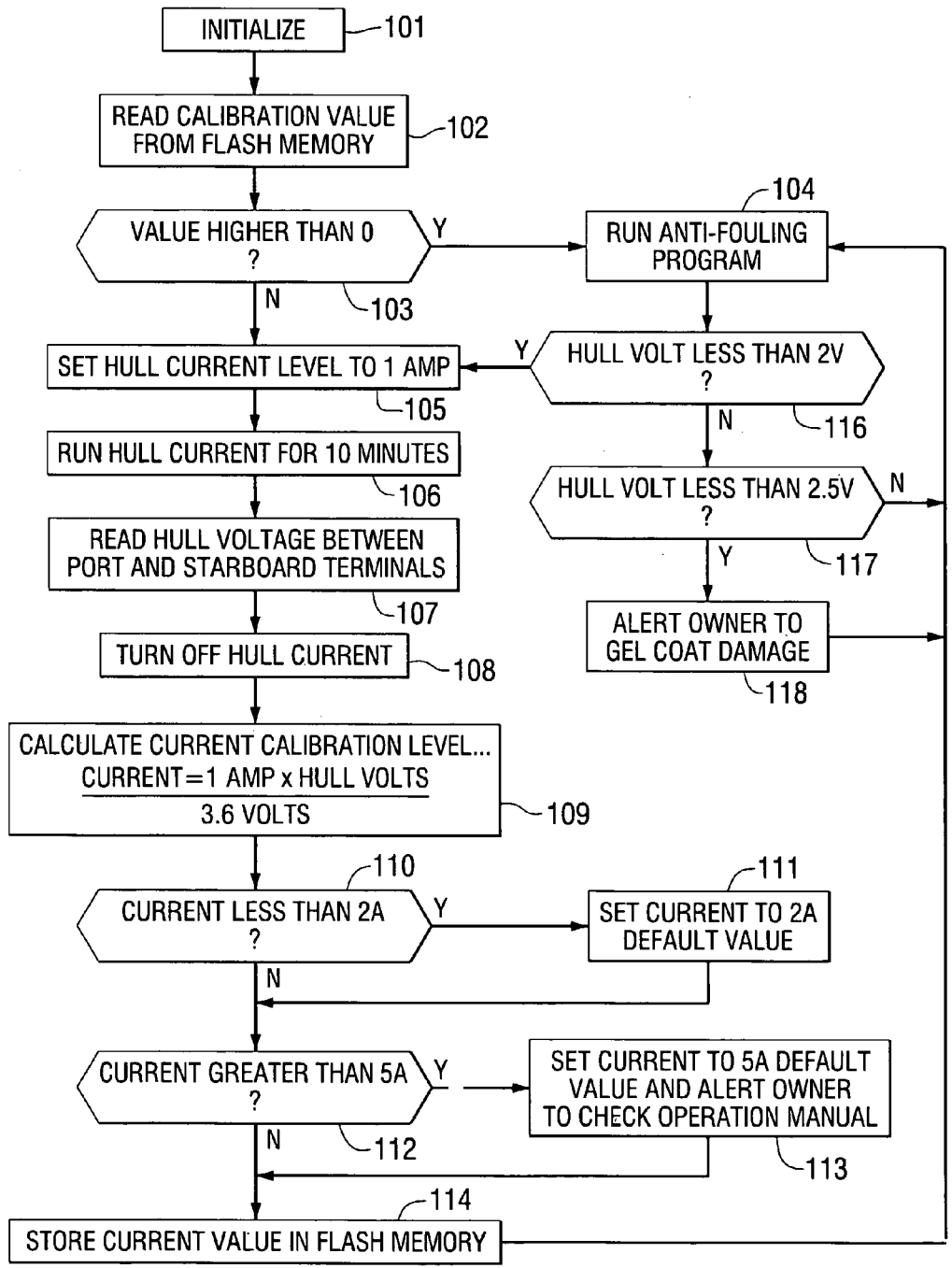
FIG. 4 is a flowchart of a system used to perform the features of the present invention.

FIG. 4 shows a flowchart that can be used in conjunction with the present invention. It would typically be performed by a microprocessor such as the one identified as U5 in FIG. 3. Following an initialization step, at functional block 101, the program determines whether or not a calibration value already exists, at functional block 102. The calibration value is a magnitude of current that has been determined to require a certain voltage magnitude between the first and second surfaces of the boat hull. If no calibration has been performed, or if a new calibration has been determined to be necessary, the value will be equal to zero. At functional block 103, the magnitude of this value is interrogated and, if it is higher than zero, the antifouling program described in the cited patents shown above, will be run. This is represented at functional block 104. However, if the calibration value is equal to zero, a calibration procedure is performed. This begins at functional block 105 by setting a hull current equal to approximately one ampere. This current is maintained for a preselected period of time, such as ten minutes, to allow polarization to occur and then a voltage potential is read between the port and starboard electrodes, 22 and 24. Functional block 106 illustrates the ten minute time period and functional block 107 represents the step of reading the voltage between the port and starboard surfaces. At this point, the hull current is turned off at functional block 108. The voltage potential measured between the first and second surfaces, 12 and 14, is later used to calculate an operating current that will be used as a calibration value for future operation of the fouling prevention system. It has been determined empirically that a voltage of approximately 3.6 volts is desirable for adequate prevention of marine fouling on the surfaces. The operating current is calculated, as described in functional block 109, by scaling the one ampere calibration current by the ratio of the voltage potential measured during calibration and a preselected magnitude of 3.6 volts. If the operating current is calculated as being less than two amperes, as determined at functional block 110, the operating current is set to two amperes as described at functional block 111. If the operating current has been calculated to be greater than five amperes as determined at functional block 112, the current is set to five amperes as a default value at functional block 113. In other words, calculated operating currents which are not between two amperes and five amperes are set to default conditions in order to optimize the operation of the fouling prevention system. These values are then stored in the memory of the microprocessor U5, as described at functional block 114.

With continued reference to FIG. 4, the running of the fouling prevention program at functional block 104 may result in a voltage potential between the electrodes, 22 and 24, which is less than two volts. If that occurs, as determined at functional block 116, the calibration procedure is run automatically by beginning at functional block 105. If the hull voltage potential is not less than two volts, it is interrogated at functional block 117 to determine whether it is less than 2.5 volts. If it is not less than 2.5 volts, the program proceeds to functional block 114. If it is less than 2.5 volts, an alarm condition is provided to the liquid crystal display 60, at functional block 118, which indicates that the gel coat surface on one of the first and second surfaces may be damaged.

With continued reference to FIG. 4, functional block 111 typically is activated when the hull is calibrated in freshwater. Functional block 113 is typically activated when the hull is either experiencing an electrical shorted condition or the surface area is too large for the controller being used. Currents calculated at functional block 109 which are greater than two amps typically indicate that the calibration has been performed in saltwater conditions.

The method of the present invention performs several valuable procedures. First, it allows the system shown in FIG. 3 to be calibrated automatically for many different sizes of hulls. Since the area of the hull surface can vary significantly from one boat to another and variation in the area will determine the voltage needed to provide a preselected current flow between the first and second surfaces, the automatic calibration provided by the present invention avoids the need for special systems to be devised for use with each boat of varying size. In addition, the calibration automatically accounts for the vessel being operated in freshwater or saltwater. Furthermore, the present invention can determine whether or not damage has occurred to the gel coat surface of the hull.

Although it is intended that the present invention be used to calibrate the system shown in FIG. 3 when first installed on a boat, the calibration can also be run when the boat is moved from saltwater to freshwater or vice versa. Also, as discussed above, the operation of the present invention will detect damage to a hull surface which affects the relationship between the voltage potential between the first and second surfaces and the current flowing through the water between the first and second surfaces.

Although the present invention has been described in terms of the port and starboard surfaces of a boat hull, it should be understood that the calibration procedures can be used when an antifouling system is used in conjunction with a submerged surface other than the hull of a boat. The surfaces can be grates on drainage and water conduits or other submerged components.

I claim:

1. A method for controlling a marine fouling prevention system, comprising the steps of:
   providing a first surface;
   providing a second surface;
   providing a source of electrical power;
   connecting said first and second surfaces to said source of electrical power;
   causing a predetermined magnitude of current to flow between said first and second surfaces for a preselected period of time;
   measuring a voltage potential between said first and second surfaces;
   determining an operating parameter of said marine fouling prevention system as a function of said voltage;
   comparing said voltage potential to a threshold voltage value; and
   determining that said marine fouling prevention system is damaged if said voltage potential is less than said threshold voltage value.

2. The method of claim 1, wherein:
   said first surface is a starboard side of a hull of a machine vessel and said second surface is a port side of a hull of said machine vessel.

3. The method of claim 1, wherein:
   said voltage potential is representative of a fault condition related to said marine fouling prevention system.

4. The method of claim 1, wherein:
   said magnitude of current is between 0.5 amperes and 1.5 amperes.

5. The method of claim 1, wherein:
   said preselected period of time is between five minutes and fifteen minutes.

6. The method of claim 1, wherein:
   said preselected period of time is actively determined by monitoring the rate of change of said voltage potential while said magnitude of current is flowing between said first and second surfaces.

7. A method for controlling a marine fouling prevention system, comprising the steps of:
   providing a first surface;
   providing a second surface;
   providing a source of electrical power;
   connecting said first and second surfaces to said source of electrical power;
   causing a preselected magnitude of current to flow between said first and second surfaces for a preselected period of time;
   measuring a voltage potential between said first and second surfaces;
   calculating an operating current for said marine fouling prevention system as a function of said voltage potential, said preselected magnitude of current, and a preselected target operating voltage;
   controlling subsequent operation of said marine fouling prevention system by regulating a current between said first and second surfaces to be generally equal to said operating current;
   comparing said voltage potential to a threshold voltage value; and
   determining that said marine fouling prevention system is damaged if said voltage potential is less than said threshold voltage value.

8. The method of claim 7, wherein:
   said first surface is a starboard side of a hull of a machine vessel and said second surface is a port side of a hull of said machine vessel.

9. The method of claim 7, wherein:
   said operating current is used to determine whether said marine fouling prevention system is operating in fresh water or salt water.

10. The method of claim 7, wherein:
    said voltage potential is representative of a fault condition related to said marine fouling prevention system.

11. The method of claim 7, further comprising:
    comparing said operating current to a first threshold operating current; and
    replacing said operating current with a first default operating current value when said operating current is less than said first threshold operating current.

12. The method of claim 11, further comprising:
    comparing said operating current to a second threshold operating current; and
    replacing said operating current with a second default operating current value when said operating current is greater than said second threshold operating current.

13. The method of claim 7, wherein:
    said preselected magnitude of current is between 0.8 amperes and 1.2 amperes.

14. The method of claim 7, wherein:
    said preselected period of time is between eight minutes and twelve minutes.

15. The method of claim 7, wherein:
    said preselected period of time is actively determined by monitoring the rate of change of said voltage potential while said preselected magnitude of current is flowing between said first and second surfaces.

16. A method for controlling a marine fouling prevention system, comprising the steps of:
    providing a first surface;
    providing a second surface;
    providing a source of electrical power;
    connecting said first and second surfaces to said source of electrical power;
    causing a preselected magnitude of current to flow between said first and second surfaces;
    measuring a voltage potential between said first and second surfaces; and calculating an operating current for said marine fouling prevention system as a function of said voltage potential, said preselected magnitude of current, and a preselected target operating voltage;

controlling subsequent operation of said marine fouling prevention system by regulating a current between said first and second surfaces to be generally equal to said operating current;

comparing said voltage potential to a threshold voltage value; and determining the operability of said marine fouling prevention system as a dual function of said voltage potential and said threshold voltage value.

17. The method of claim 16, wherein:

said first surface is a starboard side of a hull of a machine vessel and said second surface is a port side of a hull of said machine vessel.

18. The method of claim 17, wherein:

said operating current is used to determine whether said marine fouling prevention system is operating in flesh water or salt water.

19. The method of claim 16, wherein:

said voltage potential is representative of a fault condition related to said marine fouling prevention system.

20. The method of claim 16, further comprising:

comparing said operating current to a first threshold operating current;

replacing said operating current with a first default operating current value when said operating current is less than said first threshold operating current;

comparing said operating current to a second threshold operating current; and replacing said operating current with a second default operating current value when said operating current is greater than said second threshold operating current.

21. The method of claim 16, wherein:

said preselected period of time is actively determined by monitoring the rate of change of said voltage potential while said preselected magnitude of current is flowing between said first and second surfaces.

* * * * *